(12) United States Patent
Hahn

(10) Patent No.: US 7,623,703 B2
(45) Date of Patent: Nov. 24, 2009

(54) METHOD FOR REDUCING COLOR MOIRÉ IN DIGITAL IMAGES

(75) Inventor: Burkhard Hahn, Jena (DE)

(73) Assignee: Jenoptik Laser, Optik, Systeme GmbH, Jena (DE)

( * ) Notice: Subject to any disclaimer, the term of this patent is extended or adjusted under 35 U.S.C. 154(b) by 90 days.

(21) Appl. No.: 10/565,748

(22) PCT Filed: May 20, 2005

(86) PCT No.: PCT/DE2005/000936

§ 371 (c)(1),
(2), (4) Date: Jan. 24, 2006

(87) PCT Pub. No.: WO2005/114984

PCT Pub. Date: Dec. 1, 2005

(65) Prior Publication Data

US 2007/0122030 A1    May 31, 2007

(51) Int. Cl.
| G06K 9/00 | (2006.01) |
| H04N 9/73 | (2006.01) |
| G06F 15/00 | (2006.01) |
| G06K 1/00 | (2006.01) |
| H04N 1/46 | (2006.01) |

(52) U.S. Cl. ............ 382/162; 348/223.1; 348/225.1; 358/1.9; 358/533

(58) Field of Classification Search .............. None
See application file for complete search history.

(56) References Cited

U.S. PATENT DOCUMENTS

| 3,872,498 | A | * | 3/1975 | Pritchard | .............. 348/609 |
| 4,389,665 | A | * | 6/1983 | Nagao et al. | .......... 348/666 |
| 4,498,100 | A | * | 2/1985 | Bunting et al. | ......... 348/666 |
| 4,524,380 | A | * | 6/1985 | Shibata et al. | ......... 386/10 |
| 4,642,678 | A | * | 2/1987 | Cok | .................. 348/242 |

(Continued)

FOREIGN PATENT DOCUMENTS

DE    37 89 291    6/1994

(Continued)

OTHER PUBLICATIONS

Patent Abstract of Japan, Publication No. 58-050881, published Mar. 28, 1983 (Application No. 56-147769, filed Sep. 21, 1981) "Image Pickup Device" Hitachi Ltd.

(Continued)

*Primary Examiner*—Vikkram Bali
*Assistant Examiner*—Michelle Entezari
(74) *Attorney, Agent, or Firm*—Reed Smith LLP

(57) ABSTRACT

In a method for reducing color moiré in digital images, the object is to improve the suppression of color moiré in such a way that effects on edge areas and fine structures are further reduced in that low-frequency beats causing color moiré are detected and attenuated in such a way that correction is carried out only for two-dimensionally extensive areas and the edge areas and fine structures remain excluded to a great extent. A comparison of bandpass energies between the luminance channel and chrominance channels serves as a marking criterion in order initially to determine pixels in which color moiré is present and then to carry out a frequency-selective energy reduction in the chrominance channels at middle frequencies for suppressing the long-wave color moiré.

10 Claims, 2 Drawing Sheets

U.S. PATENT DOCUMENTS

| | | | |
|---|---|---|---|
| 4,821,088 A | 4/1989 | Tabei et al. | |
| 4,825,297 A * | 4/1989 | Fuchsberger et al. | 358/447 |
| 5,502,509 A * | 3/1996 | Kurashita et al. | 348/669 |
| 5,768,403 A * | 6/1998 | Suzuki et al. | 358/2.1 |
| 6,697,109 B1 * | 2/2004 | Daly | 348/268 |
| 6,724,932 B1 * | 4/2004 | Ito | 382/162 |
| 6,958,772 B1 * | 10/2005 | Sugimori | 348/222.1 |
| 7,006,686 B2 * | 2/2006 | Hunter et al. | 382/162 |
| 7,023,576 B1 * | 4/2006 | Jonsson et al. | 358/1.9 |
| 7,065,246 B2 * | 6/2006 | Xiaomang et al. | 382/162 |
| 7,221,381 B2 * | 5/2007 | Brown et al. | 345/690 |
| 7,227,552 B1 * | 6/2007 | Saito | 345/589 |
| 2002/0196472 A1 * | 12/2002 | Enomoto | 358/3.26 |
| 2004/0125411 A1 * | 7/2004 | Tonami et al. | 358/2.1 |
| 2004/0155983 A1 * | 8/2004 | Topper | 348/624 |
| 2006/0038891 A1 * | 2/2006 | Okutomi et al. | 348/222.1 |

FOREIGN PATENT DOCUMENTS

| | | |
|---|---|---|
| EP | 1 022 912 | 7/2000 |
| EP | 1 083 737 | 3/2001 |
| EP | 1 202 220 | 5/2002 |

OTHER PUBLICATIONS

Patent Abstract of Japan, Publication No. 63-155893, published Jun. 29, 1988 (Application No. 61-301688, filed Dec. 19, 1986) "Video Signal Forming Device" Fuji Photo Film Co., Ltd.

Patent Abstract of Japan, Publication No. 04-061587, published Feb. 27, 1992 (Application No. 02-173069, filed Jun 29, 1990) "Solid-State Color Image Pickup Device" Toshiba Corp.

\* cited by examiner

METHOD FOR REDUCING COLOR MOIRÉ IN DIGITAL IMAGES

CROSS-REFERENCE TO RELATED APPLICATIONS

This application claims priority of International Application No. PCT/DE2005/000936, filed May 20, 2005 and German Application No. 10 2004 025 645.4, filed May 24, 2004, the complete disclosures of which are hereby incorporated by reference.

BACKGROUND OF THE INVENTION a) Field of the Invention

The invention is directed to a method for reducing color moiré in digital images.

b) Description of the Related Art

When recording images with digital cameras, high-frequency signals are scanned at a fixed frequency given by the pixel raster of an image sensor. In large-area, finely structured regions, the sampling points often produce low-frequency beats which result in color moiré interference. The wavelengths of these beats can amount to a considerable multiple of the pixel distance and are highly dependent upon the recording situation.

Numerous technical solutions have been disclosed that relate to the reduction of moiré effects brought about in digital images by undersampling. These include solutions that prevent structures causing moiré from being transmitted to the image sensor such as optical filters by which the sharpness is removed from fine image structures before they are imaged on the image sensor, so that the high-frequency signals are absent during scanning (DE 37 89 291 T2). Also, a deliberately generated movement blur (JP 04 061 587 A) leads to a result of this kind, but image information is lost and the image sharpness is reduced in both cases.

Another possibility consists in providing an asymmetric color distribution in the pixel raster in that the color distribution does not repeat at constant intervals on the pixel matrix. Accordingly, the scanning conditions are varied and the moiré effects are reduced (U.S. Pat. No. 4,821,088).

Finally, there are known techniques which act on the image that has already been scanned in that the digital image is first transformed into a luminance/chrominance color space and then the upper frequencies of the chrominance signals are filtered out. After filtering, the image is converted back into the original RGB color space. It is disadvantageous that no distinction is made between a color moiré and actual color image signals. The occurrence of color distortions in the edge areas becomes more pronounced as the signal intensity in the channels is decreased for reducing the color moiré.

EP 1 083 737 A2 also does not succeed in adequately eliminating these color distortions because, through the exclusive use of hue values for localizing the regions in which color moiré is present, important signal characteristics of moiré phenomena are not taken into account and the moiré intensity itself is not taken into account during the color change for the localized moiré pixels by means of hue values that are averaged over a large area.

OBJECT AND SUMMARY OF THE INVENTION

Therefore, it is the primary object of the invention to improve the suppression of color moiré in such a way that the effect on edge areas and fine structures is further reduced in that low-frequency beats causing color moiré are detected and attenuated in such a way that a correction is carried out only for two-dimensionally extensive areas and the edge areas and fine structures remain excluded to a great extent.

According to the invention, this object is met by a method for reducing color moiré in digital images through the following method steps: Transformation of the color signals of the image from an initial color space into a luminance channel and into chrominance channels of a luminance/chrominance color space in which the luminance channel remains free of color signals that are transformed into the chrominance channels; an energy comparison by image points between the luminance channel and the chrominance channels that is limited to first selected frequencies in order to determine pixels that are affected by color moiré; a correction of the energy values of the pixels that are affected by color moiré in at least one of the chrominance channels, which correction is limited to second selected frequencies; and transformation of the corrected color signals of the chrominance channels and the color signals of the luminance channel back into the initial color space.

Particularly advisable and advantageous embodiments and further developments of the method according to the invention are indicated in the dependent claims.

Appreciably improved images are also achieved when the steps according to the invention are applied to the image multiple times, wherein 3 to 5 applications are already sufficient.

The invention makes use of the frequency characteristic of the color signals that is important for moiré phenomena and the comparison of bandpass energies between the luminance channel and chrominance channels as a marking criterion in order initially to determine pixels in which color moiré is present and then to carry out a frequency-selective energy reduction in the chrominance channels at middle frequencies for suppressing the long-wave color moiré. In this way, it is possible not only to determine automatically the locations on the image where signal attenuation is required, but also to determine how this signal attenuation must be carried out depending upon the intensity of the occurrence of moiré. Accordingly, the attenuation in the vicinity of edges results in fewer color distortions.

The invention will be described more fully in the following with reference to the schematic drawings.

DESCRIPTION OF THE PREFERRED EMBODIMENTS

The RGB color space serving to show the color information of the image signals of a digital image in the present embodiment example is first transformed into an rGb luminance/chrominance color space. During this transformation, according to the invention, the luminance channel remains free of the color signals that are transformed into the chrominance channels, i.e., from the color signals red R, green G and blue B the green color signal is transferred unchanged from the RGB color space serving as initial color space into the luminance channel, and the chrominance channels r and b are formed by $$r = \frac{R}{R+G+B} \text{ and } b = \frac{B}{R+G+B}.$$

Figure 1:
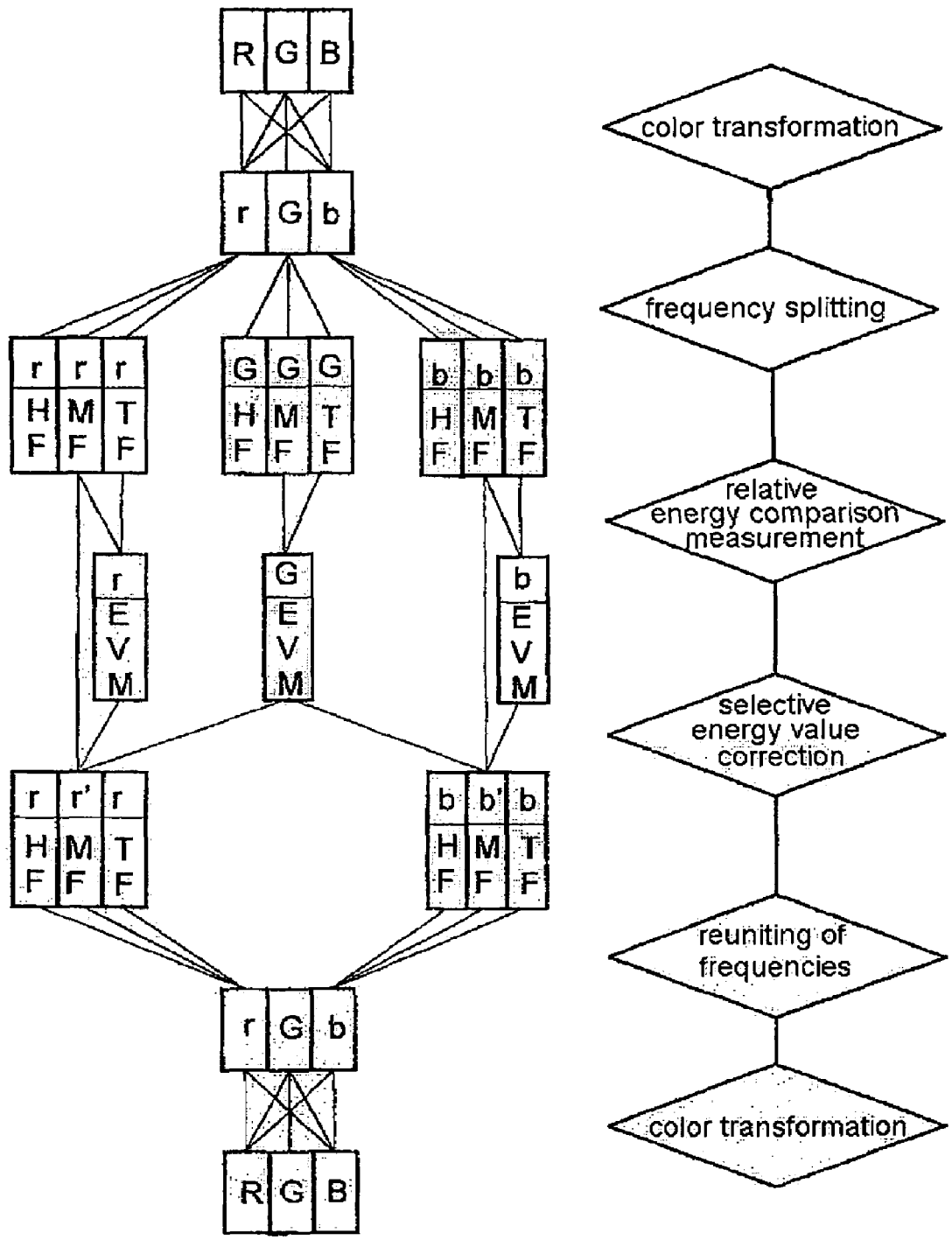
FIG. 1 shows the sequence of the method according to the invention.
Figure 2:
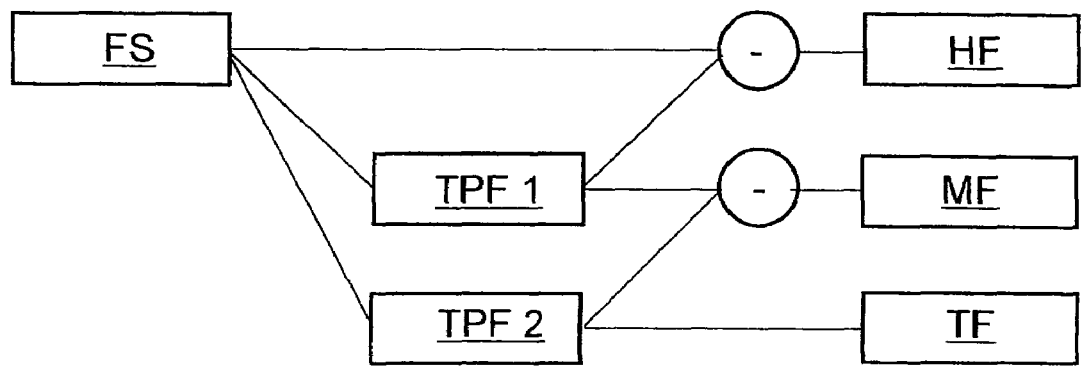
FIG. 2 shows the frequency splitting for the luminance channel and the chrominance channels.

In order to determine pixels in which color moiré is present, a division of the frequencies present in the luminance channel and chrominance channels is initially carried out, e.g., corresponding to FIG. 2, in each of the channels in that the broadband frequency signal FS in each of the channels is divided by two low-pass filters TPF 1 and TPF 2 constructed, e.g., as Gaussian averaging filters and by subtraction into three underfrequency ranges: a first underfrequency range HF comprising high frequencies, a second underfrequency range MF comprising middle frequencies and a third underfrequency range TF comprising low frequencies.

The presence of a color moiré in a pixel can be deduced based on an energy comparison, image point by image point, between the chrominance channels and the luminance channel for which a relative energy comparison measurement EVM in the form of a bandpass energy is determined image point by image point from the underfrequency range of the middle and low frequencies for the channels. The reasoning behind this is that a color signal which is present in the chrominance channels and which cannot be found in the luminance channel supplies a relative energy comparison measurement EVM in at least one of the chrominance channels which is higher than in the luminance channel and which is to be interpreted as a false signal, while a relative energy comparison measurement EVM which is determined from the selected underfrequency ranges MF and TF of the luminance channel and which is higher than a lower value of the relative energy comparison measurement EVM in the chrominance channels does not point to the presence of a color moiré.

Therefore, according to the invention, in order to suppress the color moiré a correction is carried out only for those pixels for which the comparison of the relative energy comparison measurements EVM image point by image point results in a higher value in the selected underfrequency ranges of at least one chrominance channel in relation to the underfrequency ranges of the luminance channel that are selected in this same way.

A relative energy comparison measurement EVM, according to the present embodiment example, can be formed by taking the ratio of the energy of the middle-frequency second underfrequency range to the sum of the energies of the middle-frequency second underfrequency range and low-frequency third underfrequency range.

There are various possibilities for an energy attenuation for correcting the energy values, but only those possibilities which result, according to the invention, in a selective attenuation of the signal and which do not eliminate the entire contents of the chrominance channel can be used for achieving the desired effect.

Therefore, the attenuation provided for reducing the energy value cMF_Value is preferably limited to the middle-frequency underfrequency range MF in at least one of the chrominance channels, wherein an attenuation factor α which can be varied between zero and one can influence the results of the color moiré suppression in different ways. For example, if there is a larger energy comparison measurement EVM for the luminance channel than for the chrominance channel, the attenuation factor is α=1. Otherwise, the attenuation factor α can also be a given constant that is determined empirically under certain conditions. In general, the following is true:

cMF_Value_new=α*cMF_Value.

However, the attenuation factor α should advantageously have a (mathematical) dependence on the energy comparison measurement EVM. As a result, the color moiré suppression can be made substantially more selective, which has a positive effect particularly on the edge areas present in the image. Due to the fact that membership probabilities result from the method according to the invention for selecting pixels in which color moiré is present by means of the energy comparison measurements EVM, a selective attenuation is carried out corresponding to these probabilities when the attenuation factor α depends upon the energy comparison measurement EVM. Especially good correction results are achieved when the attenuation factor α corresponds to the energy comparison measurement EVM of the luminance channel.

Of course, other dependencies are also possible. For example, the attenuation factor α can also be the product of the energy comparison measurement EVM of the luminance channel and the low-frequency energy value of a chrominance channel.

It will be apparent to the person skilled in the art that the method according to the invention can be implemented in a software solution or in a hardware solution.

After the energy value correction, the underfrequency ranges are combined again to form a total frequency range and the corrected color signals of the chrominance channels and the color signals of the luminance channel are transformed back into the initial color space.

While the foregoing description and drawings represent the present invention, it will be obvious to those skilled in the art that various changes may be made therein without departing from the true spirit and scope of the present invention.

The invention claimed is:

1. A method for reducing color moiré in digital images comprising the steps of:
   transforming the color signals of the image from an initial color space into a luminance channel and into chrominance channels of a luminance/chrominance color space in which the luminance channel remains free of color signals that are transformed into the chrominance channels;
   performing a bandpass splitting in the luminance and chrominance channels for intersecting the frequencies of the luminance and chrominance channels into several underfrequency ranges in the same manner;
   performing a comparison of energy values, pixel by pixel, between the luminance channel and the chrominance channels that is limited to first selected frequencies chosen from said underfrequency ranges in order to detect pixels in which color moiré is present when the energy value in the chrominance channel is greater than in the luminance channel;
   making a correction of the energy values of pixels, in which color moiré is detected, in at least one of the chrominance channels, wherein the correction is limited to second selected frequencies chosen from one of said underfrequency ranges; and
   transforming the corrected color signals of the chrominance channels and the color signals of the luminance channel back into the initial color space.

2. The method according to claim 1, wherein the RGB color space, where R is red, G is green and B is blue, serves as initial color space from which the transformation into the luminance/chrominance color space is carried out in that the green color signal is transferred unchanged to the luminance channel, and the chrominance channels r and b are formed by $$r = \frac{R}{R+G+B} \text{ and } b = \frac{B}{R+G+B}.$$

3. The method according to claim 2, wherein the frequencies present in the luminance channel and in the chrominance channels are split into underfrequency ranges in each of the channels, a first underfrequency range comprising high frequencies, a second underfrequency range comprising middle frequencies, and a third underfrequency range comprising low frequencies.

4. The method according to claim 3, wherein a relative energy comparison measurement EVM which is determined from the ratio of the energy of the middle-frequency second underfrequency range to the sum of the energies of the middle-frequency second underfrequency range and low-frequency third underfrequency range is used for the image point energy comparison.

5. The method according to claim 4, wherein the correction of the energy values of the pixels in which color moiré is present is limited, as a reduction of energy values, to the middle-frequency second underfrequency range in at least one chrominance channel.

6. The method according to claim 5, wherein an attenuation factor $\alpha$ that is linked to the energy comparison measurement serves to reduce energy values.

7. The method according to claim 6, wherein the attenuation factor $\alpha$ corresponds to the energy comparison measurement of the luminance channel.

8. The method according to claim 5, wherein an empirically determined constant serves as attenuation factor $\alpha$ for the energy value reduction.

9. The method according to claim 6, wherein the attenuation factor $\alpha$ corresponds to the product of the energy comparison measurement of the luminance channel and the low-frequency energy value of a chrominance channel.

10. The method for reducing color moiré in digital images, wherein the steps in claim 1 are applied multiple times.

* * * * *